127,670

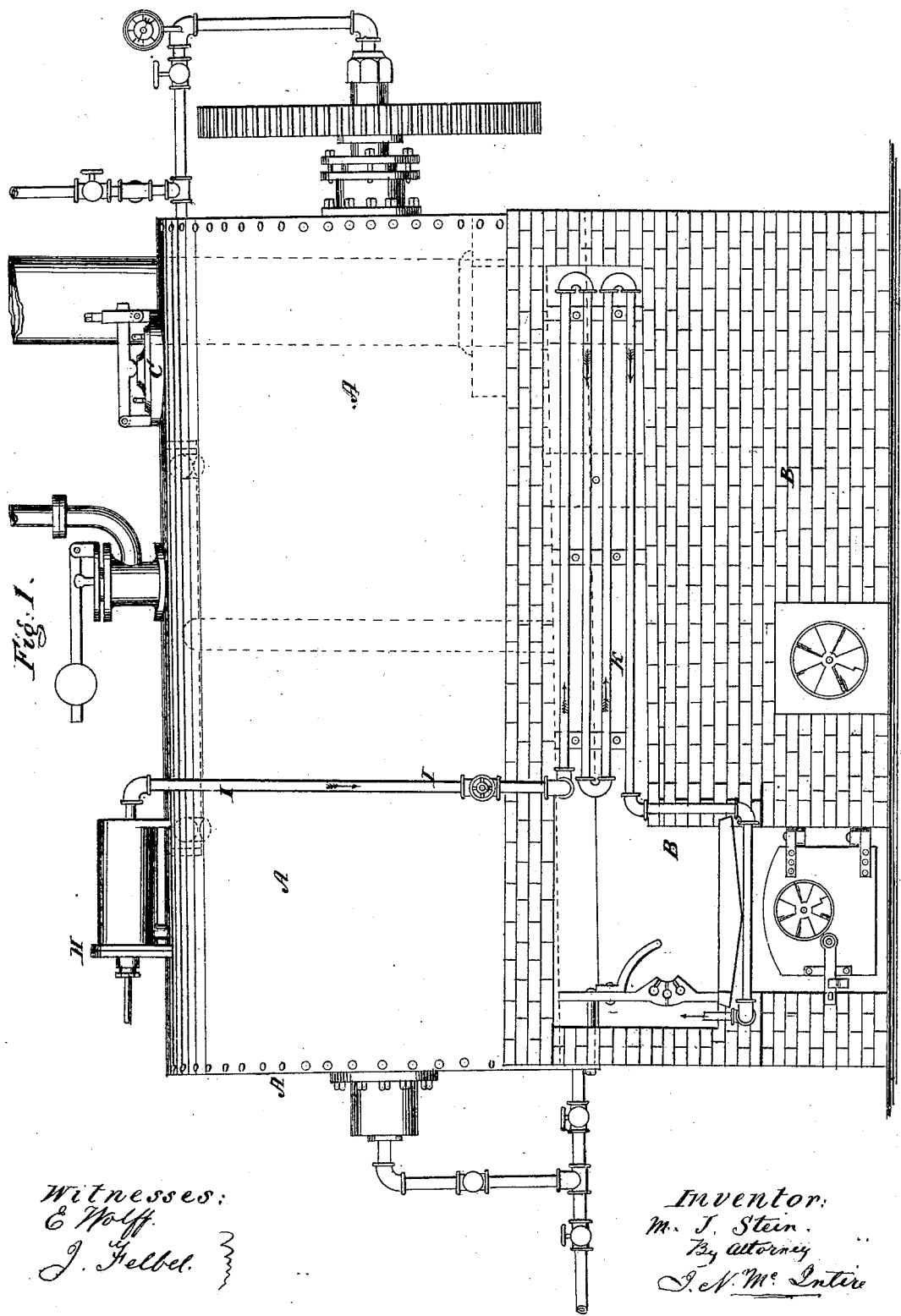

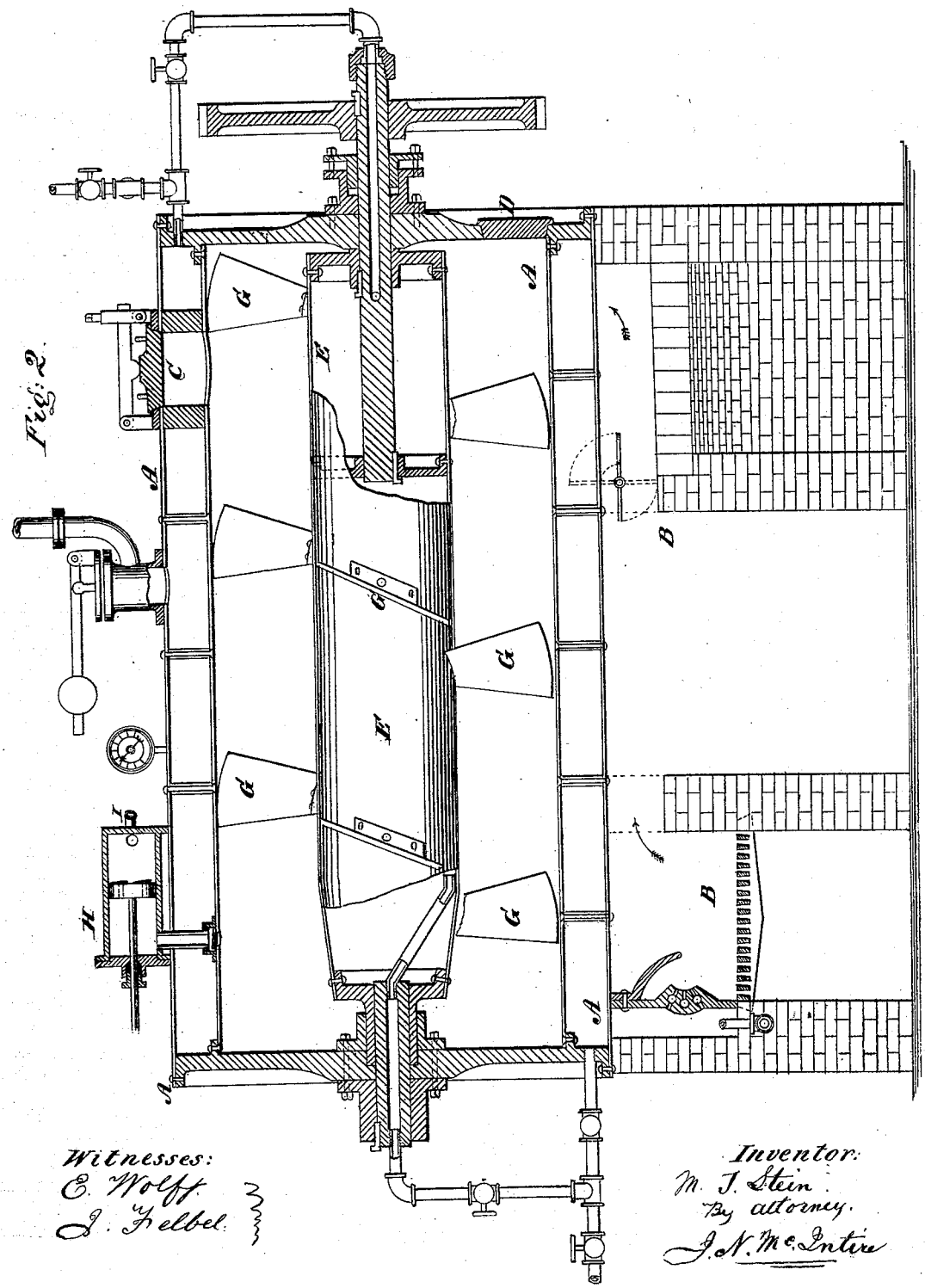

UNITED STATES PATENT OFFICE.

MICHAEL J. STEIN, OF NEW YORK, N. Y.

IMPROVEMENT IN DRYING AND DEODORIZING ANIMAL MATTERS, OILS, &c.

Specification forming part of Letters Patent No. 127,670, dated June 4, 1872.

*To all whom it may concern:*

Be it known that I, MICHAEL J. STEIN, of New York, in the county and State of New York, have invented certain new and useful Improvements in Drying and also Deodorizing various Materials and Substances; and I do hereby declare the following to be a full, clear, and exact description thereof, reference being had to the accompanying drawing and the letters of reference marked thereon.

My invention is particularly adapted to the extraction of the moisture and offensive odors from animal matter—such as animal blood, "tank-stuff," or scrap, fish-scrap, &c.—and to the drying of lumber, timber, &c., but may be adopted, with great advantage, in the treatment of other matters—as, for instance, in processes for deodorizing illuminating and lubricating oils distilled from petroleum—in which case said process may be employed for the purpose of completely deodorizing these kinds of oil.

Previous to my said invention it has been customary, in some processes for drying and deodorizing animal matter, and for extracting the moisture from lumber and other substances, to subject the material to be treated to the action of steam and heat in a closed vessel for the purpose of generating into steam all contained moisture, carrying off with the steam and gases generated the noxious odors; and in patents lately granted to me it is suggested in such processes to have the drying-chamber made perfectly tight, and to carry off the noxious gases only under pressure, to insure a more thorough extraction from the contained material of the said noxious gases and odors.

But in all the processes heretofore known it is impracticable, under all circumstances and in the treatment of all sorts of matter, to perfectly and cheaply deodorize the material. I propose by my improvement to accomplish the desirable object of completely deodorizing (without the use of chemicals) any material or substance from which it may be desired to extract the moisture and all noxious smell rapidly, cheaply, and thoroughly; and to these ends and objects my invention consists in pumping or drawing off from the closed chamber in which the material is heated and treated, and, as fast as they are generated, all the vapors and the gases (which contain the odors) so as to insure their perfect extraction from the closed chamber, and absolute separation from the solid (or liquid) matter, and effectually prevent the condensation or return back to their original condition of any vapors or noxious gases, as will be presently more fully explained; and my invention further consists in certain improvements in apparatus adapted to carry on the said new process.

To make more clear to those skilled in the art the nature of my said invention, and to enable them to work it, I will further explain my improved process by reference to the accompanying drawing, in which I have shown one of many forms of apparatus which may be used in the practice of my process.

Figure 1 is a sectional elevation, and Fig. 2 a vertical section, of an apparatus for extracting the moisture and noxious odors from animal matter, and adapted to carry on the process made the subject of my invention.

A is a close vessel mounted over a suitable furnace, B, and adapted to receive the charge or mass of material to be treated. Suitable man-holes or doors are provided, as at C and D, for the introduction and removal of the material, and adapted to be sealed in the usual manner, to make the vessel air-tight, during the conduct of the drying and deodorizing process. Within the chamber or vessel A is arranged an agitator or stirrer for disintegrating or agitating the mass of material under treatment, which is heated by steam, if desired, to assist in the heating of the material. This agitator and auxiliary heater I have shown made of a hollow rotary drum or shaft, E, provided with arms or beaters G, and so arranged and operating that while free to rotate, it is kept constantly supplied internally with the heating medium. At H is arranged an exhaust-pump, which may be driven in any desirable manner, and which connects with the interior of chamber A, also with a discharge-pipe, I, as shown. The pipe I may lead to a superheater, K, as shown, (in which the vapors and noxious gases exhausted by the pump H may be superheated, and from which they may be discharged into the furnace for destruction by combustion,) or off to a condenser, or any other desirable destination for the escape of the foul gases and vapors pumped out of the chamber A.

In the treatment of any material from which it is desired to extract, not only all the moisture, (or which it is desired to dry,) but also all unpleasant odor, the charge of material is placed in the chamber A and hermetically closed up; it is then heated and agitated in the usual or known manner; but instead of either allowing the free escape of the generated gases and vapors, or relying only on the pressure within the chamber A for the extraction of said vapors from the solid or ponderous portions of the contents of the chamber A, I exhaust them, or draw them off as fast as made, by the pump H, the action of which tends to create and maintain a vacuum within the said chamber.

By this process of exhaustion during the generation of the vapors and noxious gases I am enabled to take out of the generating-vessel A all the vapors and noxious gases as rapidly as they are generated, and before it can be possible for any portion of them to condense or undergo any other change of condition by which their moisture or odor can re-enter the ponderous portion of the contents of the chamber, (or the material from which it has been extracted by vaporization.)

The process of thus exhausting the vapors and noxious gases as fast as generated may, of course, be practiced in a different apparatus from that shown, and without any means of agitating the mass of material under treatment; but in the treatment of most materials some means for agitating the contents of the heating-vessel will be found to expedite and facilitate the process of completely deodorizing (and, in the case of some materials, drying) the charge.

The gist of my invention, it will be seen, rests in the idea of exhausting (as rapidly as possible) from the heating-chamber in which the material to be deodorized or dried (or both) is treated all the gases and vapors generated as fast as they are created, thus extracting effectually every particle of that portion of the contents of the chamber in which are embodied any noxious odors or vapors, and effectually preventing any of the said gases or vapors from subsequently becoming condensed, or from undergoing within the chamber any subsequent chemical change by which they might become reincorporated into the ponderous portions of the contents of said chamber.

It will be seen that my improved process may be employed with great advantage for the purpose of deodorization in the manufacture of illuminating and lubricating oils which are distilled from petroleum.

By subjecting these oils to my improved process by heating in a state of agitation within a close chamber and rapidly exhausting the vapors generated, by means substantially such as described, not only may the oils be deprived of all unpleasant odor, but also of those highly combustible and explosive gases, the absence of which is necessary in order to have the oil capable of withstanding the requisite fire test, (in illuminating oils,) and of being sweet and free from chemical or corrosive substances.

In this manner—that is, by exhausting or drawing off the explosive and noxious gases as rapidly as they are created (keeping the chamber exhausted all the time) by the action of the applied heat, and a constant agitation of the liquid mass—these oils may be rendered non-explosive and completely deodorized, and without the use of acids and alkalies as now used in deodorizing processes.

In the practice of my improved process for the extraction of all noxious and other vapors and gases from the materials under treatment, the degrees of heat to which the material must be subjected (either in a state of agitation or otherwise,) as well as the time requisite for the extraction of such vapors and a deodorization of the mass, will all depend, of course, upon the nature or character of the material under treatment, and with various materials and in different apparatuses will, of course, have to be determined by experiment and the judgment and experience of the operator or manufacturer.

The apparatus should be such and the process so conducted that the close chamber in which the material is under treatment by heat (for the generation and separation from the ponderous portion of the noxious and other vapors) shall be completely exhausted of the vapors and gases as fast as they are created, and where the character of the vapors which it is desired to extract and the temperature at which they are generated are known, the process of exhaustion should cease as soon as they are carried off, to prevent the loss (in some cases) of substances which may, with advantage, be allowed to remain in the chamber with the material being treated.

I do not claim, broadly, treating petroleum and its products, or the rendering of animal matter, *in vacuo*, for I am aware that petroleum and its products have been treated with more or less success by a process in which an exhaust-pump has been brought into use, and that the same is true in reference to the rendering of fat from animal matter; but I am not aware that animal or other matter which it is desired to dry, and in some cases to deodorize, has been treated by heat *in vacuo* to accomplish these ends.

What I claim as new, and desire to secure by Letters Patent, is—

1. My improved process, substantially as hereinbefore described—that is to say, exhausting from the heating-chamber or vessel the noxious and other vapors and gases as fast as generated therein.

2. I also claim the use, for the purpose of conducting the herein-described process, of an air-tight heating-chamber and a means for exhausting the vapors and gases, arranged to operate together, substantially as described.

3. I also claim, in an apparatus for conducting the herein-described process, the use, in connection with the heating-chamber and the means for exhausting the gases and vapors therefrom, of a device for agitating the heated contents, and thus facilitating the operation of exhaustion, substantially as described.

In testimony whereof I have hereunto set my hand and seal this 16th day of May, 1872.

MICHAEL J. STEIN. [L. S.]

In presence of—
 GEO. A. GREENWARD,
 JACOB FELBEL.